United States Patent Office 3,068,250
Patented Dec. 11, 1962

3,068,250
16α-ALKYL 21-ALDEHYDE HYDRATE STEROIDS AND PROCESSES FOR PREPARING THE SAME
Glen E. Arth, Cranford, Roger E. Beyler, Westfield, and Lewis H. Sarett, Princeton, N.J., assignors to Merck & Co., Inc., Rahway, N.J., a corporation of New Jersey
No Drawing. Filed Aug. 29, 1958, Ser. No. 757,926
6 Claims. (Cl. 260—397.45)

This invention is concerned generally with novel steroid compounds and with processes of preparing the same, more particularly, it relates to 16α-alkyl-11-oxygenated steroids of the pregnane series unsaturated in ring A. It relates also to novel processes for producing 16α-alkyl steroids.

The new products of our invention may be represented by the following formula

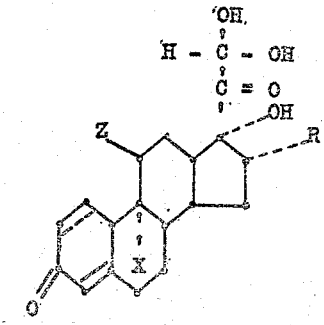

wherein X is hydrogen or halogen, Z is hydroxy or oxygen, and R is alkyl. The broken line between carbon atoms 1 and 2 indicates that a double bond may be present in this position.

The 16α-alkyl steroids produced in accordance with the present invention possess high anti-inflammatory activity, and are especially effective for the treatment of arthritis and related diseases since they can be administered for their cortisone-like action in extremely low dosage thereby minimizing undesired side effects.

In preparing our novel chemical compounds, the starting material utilized may be

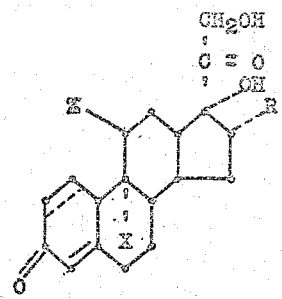

wherein X is hydrogen or halogen, Z is hydroxy or oxygen, and R is alkyl. The broken line between carbon atoms 1 and 2 indicates that a double bond may be present in this position.

The above starting material is reacted with an oxygenating agent such as copper acetate to form a compound represented by the following

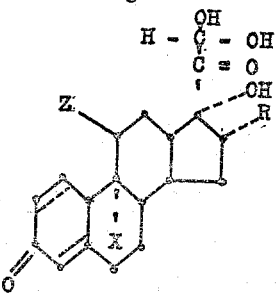

wherein X, Z and R are as above.

The 16α-alkyl-17α,21-dihydroxy-11-oxygenated-4-pregnene-3,20-diones used as starting materials in this process are conveniently prepared starting with the known 3α-hydroxy-16-pregnene-11,20-dione 3-acetate in accordance with the following procedure:

3α-hydroxy-16-pregnene-11,20-dione 3-acetate is reacted with alkyl magnesium halide, thereby forming 16α-alkyl-3α-hydroxy-11,20-pregnanedione 3-acetate, which is reacted with aqueous methanolic hydrochloric acid to form 16α-alkyl-3α-hydroxy-11,20 - pregnanedione. The latter compound is reacted with acetic anhydride in the presence of p-toluene sulfonic acid catalyst to form a mixture of enol acetates containing 16α-alkyl-3α,20-dihydroxy-17(20)-pregnene-11-one 3,20-diacetate; this mixture, after chromatographic purification to remove any unchanged starting material, is reacted with perbenzoic acid and the resulting 16α-alkyl-17α,20-epoxy-3α,20-dihydroxy-11-pregnanone 3,20-diacetate is hydrolyzed with methanolic potassium bicarbonate to produce 16α-alkyl-3α,17α-dihydroxy-11,20-pregnanedione. The latter compound is reacted with bromine in chloroform to form 16α-alkyl-21-bromo-3β,17α-dihydroxy - 11,20 - pregnanedione which is reacted with sodium iodide in acetone to produce 16α-alkyl-3α,17α-dihydroxy-11,20-pregnanedione which is converted without isolation to 16α-alkyl-3α,17α,21-trihydroxy-11,20-pregnanedione 21-acetate by reaction with anhydrous potassium acetate; this compound is reacted with chromium trioxide in pyridine to form 16α-alkyl-17α,21-dihydroxy-3,11,20-pregnanetrione 21-acetate. The 16α - alkyl-17α,21-dihydroxy-3,11,20-pregnanetrione 21-acetate is reacted with bromine in glacial acetic acid-chloroform to produce 16α-alkyl-4-bromo-17α,21-dihydroxy-3,11,20-pregnanetrione, which is then reacted with semicarbazide to form 16α-alkyl-17α,21-dihydroxy-4-pregnene-3,11,20-trione 3,20-bis-semicarbazone 21-acetate. This 3,20-bis-semicarbazone is reacted with sodium borohydride to form 16α-alkyl-11β,17α,21-trihydroxy-4-pregnene-3,20-dione-3,20-bis-semicarbazone which is hydrolyzed under acid conditions to form 16α-alkyl-11β,17α,21-trihydroxy-4-pregnene-3,20-dione; this compound is reacted with esterifying agents as for example benzoic anhydride or lower alkanoic anhydrides to form the corresponding 21-ester derivatives.

The 16α-alkyl-17α,21-dihydroxy-4-pregnene-3,11,20-trione-3,20-bis-semicarbazone 21-acetate is reacted with potassium bicarbonate or potassium hydroxide in aqueous methanol to form 16α-alkyl-17α,21-dihydroxy-4-pregnene- 3,11,20-trione 3,20-bis-semicarbazone which is then hydrolyzed under acid conditions to produce 16α-alkyl-17α,21-dihydroxy-4-pregnene-3,11,20-trione 21-free alcohol; this compound is esterified using the above-mentioned esterifying agents to produce the corresponding 21-ester derivatives.

The 16α-alkyl-11β,17α,21-trihydroxy-4-pregnene-3,20-dione, upon reaction with acetic anhydride in pyridine, gives the corresponding 21-acetate which is reacted with methane sulfonyl chloride followed by potassium acetate, or phosphorus oxychloride, to produce 16α-alkyl-17α,21-dihydroxy-4,9(11)-pregnadiene-3,20-dione 21-acetate; the latter compound is reacted with hypobromous acid to produce 16α-alkyl-9α-bromo-11β,17α-21-trihydroxy-4-pregnene-3,20-dione 21-acetate which is reacted with anhydrous potassium acetate in ethanol to produce 16α-alkyl-9,11-epoxy-17α,21-dihydroxy-4-pregnene-3,20-dione 21-acetate. This 9,11-epoxide is then reacted with hydrogen fluoride in tetrahydrofuran to produce 16α-alkyl-9α-fluoro-11β,17α,21-trihydroxy-4-pregnene-3,20-dione 21-acetate; this compound is reacted with a hydrolyzing agent to form 16α-alkyl-9α-fluoro-11β,17α,21-trihydroxy-4-pregnene-3,20-dione 21-free alcohol. This 21-free alcohol is reacted with esterifying agents such as benzoic anhydride, lower alkanoic anhydrides and the like to form the corresponding 21-ester derivatives.

The 16α-alkyl-9α-fluoro-11β,17α,21-trihydroxy-4-pregnene-3,20-dione 21-acetate is reacted with chromium trioxide in pyridine to form 16α-alkyl-9α-fluoro-17α,21-dihydroxy-4-pregnene-3,11,20-trione 21-acetate which, upon reaction with a hydrolyzing agent, forms 16α-alkl-9α-fluoro-17α,21-dihydroxy-4-pregnene-3,11,20-trione 21-free alcohol. This 21-free alcohol is reacted with esterifying agents such as benzoic anhydride, lower alkanoic anhydrides and the like to form the corresponding 21-ester derivatives.

The 16α-alkyl-17α,21-dihydroxy-4-pregnene-3,20-dione or 21-ester compound or, if preferred, the corresponding saturated 16α-alkyl-17α,21-dihydroxy-3,20-pregnanedione or 21-ester compound is reacted with selenium dioxide thereby effecting ring A dehydrogenation to form the corresponding 16α-alkyl-17α,21-dihydroxy-1,4-pregnadiene-3,20-dione or 21-ester compound. This selenium dioxide dehydrogenation procedure is conveniently conducted by bringing the 16α-alkyl-17α,21-dihydroxy-4-pregnene-3,20-dione or 21-ester or 16α-alkyl-17α,21-dihydroxy-3,20-pregnanedione or 21-ester compound, and selenium dioxide together in the presence of an organic solvent such as, for example, dioxane, an alcohol solvent such as t-butanol, etc., and heating the mixture at an elevated temperature. When t-butanol is used as the solvent, it is ordinarily preferred to carry out this reaction at the boiling point of the solvent, under which conditions the reaction is ordinarily complete in about fifteen hours. The reaction mixture is ordinarily filtered, thereby removing metallic selenium, and the filtered solution is evaporated to dryness in vacuo to give the desired 16α-alkyl-17α,21-dihydroxy-1,4-pregnadiene-3,20-dione compound.

In all of the previously described reactions, R has been designated as alkyl, and is intended to include the lower alkyl groups such as methyl, ethyl, and propyl or aryl alkyl groups. X is halogen and is intended to include bromo, chloro, fluoro and iodo. It will be evident to those skilled in the art that other groups may be substituted for those recited here and these definitions are intended only as some indication of the operable class of compounds.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

EXAMPLE 1

*Preparation of 17α,21,21-Trihydroxy-16α-Methyl-4-Pregnene-3,11,20-Trione*

To 500 mg. of 17α,21-dihydroxy-16α-methyl-4-pregnene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes, the BT test is very weak; after 30 minutes the solution is decanted from copper oxide, 100 mg. of the sodium salt of ethylene diaminetetraacetic acid added, and concentrated under reduced pressure to a small volume. Addition of water gives crude crystalline 17α,21,21-trihydroxy-16α-methyl-4-pregnene-3,11,20-trione. Recrystallization from aqueous methanol yields a pure product.

The BT test referred to above relates to the conversion of the 17α,21-dihydroxy-20-keto moiety of the steroid to a 17α,21,21-trihydroxy-20-keto which is readily followed by use of the dianisole bisphenyltetrazolium chloride reagent commonly known as the BT reagent or the BT test. This reagent reacts specifically with the dihydroxy acetone grouping to give a deep blue solution. It does not form a deep blue color with the trihydroxy steroids. By means of this BT test, therefore, the degree of reaction can be followed quantitatively or if desired, only semi-quantitatively, since the intensity of the blue color is the function of the amount of 17α,21-dihydroxy-20-keto steroid present in the solution tested. This intensity of color can be conveniently measured against a known standard solution and the extract of reaction easily calculated. Use of the blue tetrazolium (BT) reagent in assaying for the presence of a dihydroxy acetone moiety is described more fully in a publication by Mader et al., Anal. Chem. 24, 666 (1952).

The starting material for this example, namely, 17α,21-dihydroxy-16α-methyl-4-pregnene-3,11,20-trione can be prepared, starting with the known 3α-hydroxy-16-pregnene-11,20-dione 3-acetate in accordance with the following procedure:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-hydroxy-16-pregnene-11,20-dione 3-acetate in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the holvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 3α-hydroxy-16α-methyl-11,20-pregnadione 3-acetate.

To a solution of 0.8 g. of 3α-hydroxy-16α-methyl-11,20-pregnanedione 3-acetate in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 3α-hydroxy-16α-methyl-11,20-pregnanedione.

A solution of 22 g. of 3α-hydroxy-16α-methyl-11,20-pregnadione 21-acetate and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then eluted with 85:15 petroleum-ether-ether mixture, and the first four liters of elute is collected, and evaporated to dryness in vacuo to give a mixture of enol acetates containing 3α,20-dihydroxy-16α-methyl-17(20)-pregnene-11-one 3,20-diacetate. This mixture of enolates, weighing approximately 14 g., is dissolved in 50 ml. of benzene and treated with an excess of per-benzoic acid over a 16-hour period. The reaction mixture is shaken with dilute aqueous potassium hydroxide solution until the benzene layer is free of perbenzoic acid; the benzene is then washed with water until neutral, dried, and the solvent evaporated in vacuo to give a crystalline material, 3α,20-dihydroxy-16α-methyl-17α,20-epoxy-11-pregnanone-3,20-diacetate. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chlorofrom extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methyl-11,20-pregnanedione.

To a solution of 7.0 of 3α,17α-dihydroxy-16α-methyl-11,20-pregnanedione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration, washed, by slurrying, with 50:50 ether-petroleum ether mixture to give about 5 g. of 21-bromo-3α,17α-dihydroxy-16α-methyl-11,20-pregnanedione.

This 5 g. of 21-bromo-3α,17α-dihydroxy-16α-methyl-11,20-pregnanedione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 3α,17α,21-trihydroxy-16α-methyl-11,20-pregnanedione 21-acetate.

A solution of 400 mg. of 3α,17α,21-trihydroxy-16α-methyl-11,20-pregnanedione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at 0° C., and then with water until neutral. The organic solvent layer is then dried, the solvents are evaporated therefrom in vacuo, and the residual crystalline material is purified by the crystallization from ethyl acetate to give 17α,21-dihydroxy-16α-methyl-3,11,20-pregnanetrione 21-acetate.

To 100 mg. of 17α,21-dihydroxy-16α-methyl-3,11,20-pregnanetrione 21-acetate dissolved in 2 ml. of chloroform and 2.25 ml. of glacial acetic acid, at a temperature of −55° C., is added two drops of a 0.001 N solution of dry hydrogen bromide in glacial acetic acid, at −55° C., is added 0.43 ml. of a solution containing 40 mg. of bromine in chloroform, and the resulting solution is added, over a period of about 10 minutes, to the solution of the steroid, while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-17α,21-dihydroxy-16α-methyl-3,11,20-pregnanetrione 21-actate.

A mixture of 48 mg. of semicarbazide, 48 mg. of 4-bromo-17α,21-dihydroxy-16α-methyl-3,11,20-pregnanetrione 21-acetate, 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 17α,21-dihydroxy-16α-methyl-4-pregnene-3,11,20-trione-3,20-bis-semicarbazone 21-acetate. Fifty milligrams of 17α,21-dihydroxy-16α-methyl-4-pregnene-3,11,20-trione-3,20-bis-semicarbazone-21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 17α,21-dihydroxy-16α-methyl-4-pregnene-3,11,20-trione-3,20-bis-semicarbazone.

A mixture of 60 mg. of 17α,21-dihydroxy-16α-methyl-4-pregnene-3,11,20-trione-3,20-bis-semicarbazone, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 17α,21-dihydroxy-16α-methyl-4-pregnene-3,11,20-trione.

EXAMPLE 2

*Preparation of 9α-Fluoro-17α,21,21-Trihydroxy-16α-Methyl-4-Pregnene-3,11,20-Trione*

To 500 mg. of 9α-fluoro-17α,21-dihydroxy-16α-methyl-4-pregnene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes, the BT test is very weak; after 30 minutes the solution is decanted from copper oxide, 100 mg. of the sodium salt of ethylene diamine-tetraacetic acid is added and concentrated under reduced pressure to a small volume. Addition of water gives crude crystalline 9α-fluoro-17α,21,21-trihydroxy-16α-methyl-4-pregnene-3,11,20-trione. Recrystallization from aqueous methanol yields a pure product.

The starting material, 9α-fluoro-17α,21-dihydroxy-16α-methyl-4-pregnene-3,11,20-trione can be prepared as follows:

A solution of 400 mg. of 9α-fluoro-11β,17α,21-trihydroxy-16α-methyl-4-pregnene-3,20-dione 21-acetate prepared as described hereinafter in Example 4 in 4 ml. of pyridine is added to the complex formed by the addition of 400 mg. of chromium trioxide to 4 ml. of pyridine. The mixture is swirled until thoroughly mixed and then allowed to stand at room temperature for about 16 hours. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate-ether to give 9α-fluoro-17α,21-dihydroxy-16α-methyl-4-pregnene-3,11,20-trione 21-acetate.

Fifty milligrams of 9α-fluoro-17α,21-dihydroxy-16α-methyl-4-pregnene-3,11,20-trione 20-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21-dihydroxy - 16α - methyl - 4 - pregnene-3,11,20-trione.

EXAMPLE 3

*Preparation of 11β,17α,21,21-Tetrahydroxy-16α-Methyl-4-Pregnene-3,20-Dione*

To 500 mg. of 11β,17α,21,21-trihydroxy-16α-methyl-4-pregnene-3,20-dione, in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes the BT test is very weak; after 30 minutes the solution is decanted from copper oxide, 100 mg. of the sodium salt of ethylene diamine-tetraacetic acid is added, and concentrated under reduced pressure to a small volume. Addition of water gives crude crystalline 11β,17α,21,21-tetrahydroxy-16α-methyl-4-pregnene-3,20-dione. Recrystallization from aqueous methanol yields a pure product.

The starting material, namely, 11β,17α,21-trihydroxy-16α-methyl-4-pregnene-3,20-dione 21-acetate is prepared by the following procedure:

A solution of 45 mg. of 17α,21-dihydroxy-16α-methyl-4-pregnene-3,11,20-trione-3,20-bis-semicarbazone 21-acetate (prepared as described in Example 1), 17 mg. of sodium borohydride, 1 ml. of tetrahydrofuran and 0.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 11β,17α,21-trihydroxy-16α-methyl-4-pregnene-3,20-dione 3,20-bis-semicarbazone.

A mixture of 60 mg. of 11β,17α,21-trihydroxy-16α-methyl - 4 - pregnene-3,20-dione 3,20-bis-semicarbazone, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 11β,17α,21-trihydroxy-16α-methyl-4-pregnene-3,20-dione.

EXAMPLE 4

*Preparation of 9α-Fluoro - 11β,17α,21,21 - Tetrahydroxy-16α-Methyl-4-Pregnene-3,20-Dione*

To 500 mg. of 9α-fluoro-11β,17α,21-trihydroxy-16α-methyl-4-pregnene-3,20-dione, in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes the BT test is very weak; after 30 minutes the solution is decanted from copper oxide, 100 mg. of the sodium salt of ethylene diamine-tetraacetic acid is added, and concentrated under reduced pressure to a small volume. Addition of water gives crude crystalline 9α-fluoro-11β,17α,21,21-tetrahydroxy-16α-methyl-4-pregnene - 3,20 - dione. Recrystallization from aqueous methanol yields a pure product.

The starting material 9α-fluoro-11β,17α,21-trihydroxy-16α-methyl-4-pregnene-3,20-dione can be prepared as follows:

To a cooled solution of 600 mg. of 11β,17α,21-trihydroxy-16α-methyl-4-pregnene-3,20-dione 21-acetate (prepared as described in Example 3) in 5.0 ml. of dry pyridine is added 0.15 ml. of methane sulfonyl chloride and the mixture is allowed to stand at room temperature for a period of approximately 15 hours. The reaction solution is evaporated in vacuo at a temperature of about 20° C. to a volume of 2–3 m. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent evaporated in vacuo; the residual material is triturated with ether, and the crystalline material is recrystallized from ethyl acetate-ether to give 17α,21-dihydroxy-16α,methyl-4,9(11)-pregnadine-3,20-dione 21-acetate.

A suspension of 330 mg. of 17α,21-dihydroxy-16α-methyl-4,9(11)-pregnadiene-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours, during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-11β,17α,21-trihydroxy-16α-methyl - 4 - pregnene-3,20-dione 21-acetate.

A solution of 210 mg. of 9α-bromo-11β,17α,21-trihydroxy-16α-methyl-4-pregnene-3,20-dione 21-acetate and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 9,11-epoxy-17α,21-dihydroxy-16α-methyl-4-pregnene-3,20-dione 21-acetate.

To a solution of 83 mg. of anhydrous hydrogen fluoride in 4.7 ml. of ice-cold alcohol-free chloroform is added an ice-cold solution of 416 mg. of 9,11-epoxy-17α,21-dihydroxy-16α-methyl-4-pregnene-3,20-dione 21 - acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro-11β,17α,21-trihydroxy-16α-methyl-4 - pregnene - 3,20 - dione 21 - acetate. Fifty milligrams of 9α-fluoro-11β-17α,21-trihydroxy-16α-methyl-4-pregnene-3,20-dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-11β,17α,21-trihydroxy-16α-methyl-4 - pregnene-3,20-dione.

EXAMPLE 5

*Preparation of 17α,21,21-Trihydroxy-16α-Methyl-1,4-Pregnadiene-3,11,20-Trione*

To 250 mg. of 17α,21-dihydroxy-16α-methyl-1,4-pregnadiene-3,11,20-trione in 10 ml. of methanol is added a solution of 750 mg. of copper acetate in 10 ml. of 80% methanol containing two drops of acetic acid. This mixture is placed in an oil-bath maintained at 60° C. and the progress of reaction followed by periodic testing with BT reagent. In 20 minutes, the BT test was very weak; after 30 minutes, the solution is decanted from copper oxide, 100 mg. of the sodium salt of ethylene diaminetetraacetic acid is added, and concentrated under reduced pressure to a small volume. Addition of water gives crude crystalline 17α,21,21-trihydroxy-16α-methyl-1,4-pregnadiene-3,11,20-trione. Recrystallization from aqueous methanol yields a pure product.

The starting material 17α,21-dihydroxy-16α-methyl-1,4-pregnadiene-3,11,20-trione can be prepared as follows:

To a solution of 110 mg. of 17α,21-dihydroxy-16α-methyl-4-pregnene-3,11,20-trione 21-acetate (prepared as described in Example 1) in 6 ml. of t-butanol, 0.01 ml. of glacial acetic acid and 0.03 ml. of acetic anhydride is added 70 mg. of selenious acid ($H_2SeO_3$). The mixture is heated to the boiling point for about 16 hours, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 17α,21-dihydroxy-16α-methyl - 1,4 - pregnadiene-3,11,20-trione 21-acetate. M.P. 208–212° C.

EXAMPLE 6

*Preparation of 9α-Fluoro - 17α,21,21 - Trihydroxy - 16α-Methyl-1,4-Pregnadiene-3,11,20-Trione*

To 250 mg. of 9α-fluoro-17α,21-dihydroxy-16α-methyl-1,4-pregnadiene-3,11,20-trione in 5 ml. of methanol is added a solution of 750 mg. of copper acetate in 10 ml. of 80% methanol containing two drops of acetic acid. This mixture is placed in an oil-bath maintained at 60° C. and the progress of the reaction followed by periodic testing with BT reagent. In 20 minutes the BT test is very weak; after 30 minutes the solution is decanted from copper oxide, 100 mg. of the sodium salt of ethylene diamine-tetraacetic acid added, and concentrated under reduced pressure to a small volume. Addition of water gives crude crystalline 9α-fluoro-17α,21,21-trihydroxy-16α-methyl-1,4-pregnadiene-3,11,20 - trione. Recrystallization from aqueous methanol yields a pure product.

The 9α-fluoro-17α,21-dihydroxy-16α-methyl-1,4 - pregnadiene-3,11,20-trione used as a starting material in this example is prepared as follows:

11β,17α,21 - trihydroxy - 16α-methyl-1,4-pregnadiene-3,20-dione 21-acetate prepared as described in Example 7 is reacted with sulfonyl chloride to form 17α,21-dihydroxy - 16α-methyl-1,4,9(11)-pregnatriene-3,20-dione 21-acetate. The latter compound is then reacted with N-bromo-succinimide in the presence of dioxane to form 9α - bromo - 11β,17α,21-trihydroxy-16α-methyl-1,4-pregnadiene-3,20-dione 21-acetate. Upon reacting the latter compound with potassium acetate, there is formed 9,11-epoxy - 17α,21 - dihydroxy-16α-methyl-1,4-pregnadiene-3,20-dione 21-acetate. The latter compound is then reacted with hydrogen fluoride to form 9α-fluoro-11β,17α, 21 - trihydroxy-16α-methyl-1,4-pregnadiene-3,20-dione 21-acetate. Oxidation with chromium trioxide results in the formation of 9α-fluoro-17α,21-dihydroxy-16α-methyl-1,4-pregnadiene-3,11,20-trione 21-acetate.

EXAMPLE 7

*Preparation of 11β,17α,21,21-Tetrahydroxy-16α-Methyl-1,4-Pregnadiene-3,20-Dione*

To 100 mg. of 11β,17α,21-trihydroxy-16α-methyl-1,4-pregnadiene-3,20-dione in 10 ml. of methanol is added a solution of 600 mg. of copper acetate in 1 ml. of 80% methanol containing two drops of acetic acid. This mixture is placed in an oil-bath maintained at 60° C. and the progress of the reaction followed by periodic testing with BT reagent. In 20 minutes, the BT test is very weak; after 30 minutes, the solution is decanted from copper oxide, 100 mg. of the sodium salt of ethylene diaminetetraacetic acid is added and concentrated under reduced pressure to a small volume. Addition of water gives crude crystalline 11β,17α,21,21 - tetrahydroxy - 16α - methyl-1,4-pregnadiene-3,20-dione. Recrystallization from aqueous methanol yields a pure product.

The starting material, 11β,17α,21-trihydroxy-16α-methyl-1,4-pregnadiene-3,20-dione can be prepared as follows:

To a solution of 100 mg. of 11β,17α,21-trihydroxy-16α-methyl-4-pregnene-3,20-dione 21-acetate (prepared as described in Example 3) in 6 ml. of t-butanol, 0.01 ml. of glacial acetic acid and 0.03 ml. of acetic anhydride is added 70 mg. of selenious acid. The mixture is heated to the boiling point for about 16 hours, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 11β,17α,21-trihydroxy-16α-methyl-1,4-pregnadiene-3,20-dione 21-acetate.

EXAMPLE 8

*Preparation of 9α-Fluoro-11β,17α,21,21-Tetrahydroxy-16α-Methyl-1,4-Pregnadiene-3,20-Dione*

To 100 mg. of 9α-fluoro-11β,17α,21-trihydroxy-16α-methyl-1,4-pregnadiene-3,20-dione in 10 ml. of methanol is added a solution of 750 mg. of copper acetate in 10 ml. of 80% methanol containing two drops of acetic acid. This mixture is placed in an oil-bath maintained at 60° C. and the progress of the reaction followed by periodic testing with BT reagent. In 20 minutes, the BT test is very weak; after 30 minutes the solution is decanted from copper oxide, 100 mg. of the sodium salt of ethylene diamine-tetraacetic acid is added, and concentrated under reduced pressure to a small volume. Addition of water gives crude crystalline 9α-fluoro-11β,17α,21,21-tetrahydroxy-16α-methyl-1,4-pregnadiene-3,20-dione. Recrystallization from aqueous methanol yields a pure product.

The starting material for this example is, namely, 9α-fluoro-11β,17α,21-trihydroxy-16α-methyl-1,4-pregnadiene-3,20-dione, and is described in the preceding Example 7.

Various changes and modifications may be made in the present invention, certain preferred embodiments of which are herein disclosed, without departing from the scope thereof; to the extent that these changes and modifications are within the scope of the appended claims, they are to be considered a part of this invention.

What is claimed is:

1. 16α - lower alkyl-9α-fluoro-17α,21,21-trihydroxy-1,4-pregnadiene-3,11,20-trione.
2. 9α - fluoro - 17α,21,21 - trihydroxy-16α-methyl-1,4-pregnadiene-3,11,20-trione.
3. 16α - lower alkyl - 11β,17α,21,21-tetrahydroxy-1,4-pregnadiene-3,20-dione.
4. 11β,17α,21,21 - tetrahydroxy-16α-methyl-1,4-pregnadiene-3,20-dione.
5. 16α - lower alkyl-9α-fluoro-11β,17α,21,21-tetrahydroxy-1,4-pregnadiene-3,20-dione.
6. 9α - fluoro-11β,17α,21,21-tetrahydroxy-16α-methyl-1,4-pregnadiene-3,20-dione.

References Cited in the file of this patent

UNITED STATES PATENTS

| | | |
|---|---|---|
| 2,773,077 | Conbere | Dec. 4, 1956 |
| 2,846,456 | Sarett | Aug. 5, 1958 |
| 2,982,774 | Tishler | May 2, 1961 |

OTHER REFERENCES

Leanza et al.: J.A.C.S. 76, pages 1691–94, 1954.
Herzog et al.: J. Org. Chem. 21, pages 688–89, 1956.